United States Patent [19]

Taylor

[11] 3,915,637

[45] Oct. 28, 1975

[54] ANALYSIS FOR WATER AND FEED ADDITIVES

[75] Inventor: Gregg W. Taylor, Murrayville, Ga.

[73] Assignee: A.H.P., Inc., Gainesville, Ga.

[22] Filed: Mar. 22, 1974

[21] Appl. No.: 454,000

Related U.S. Application Data

[63] Continuation-in-part of Ser. No. 342,290, March 16, 1973.

[52] U.S. Cl. ............................................. 23/230 B
[51] Int. Cl.² ......................................... G01N 33/16
[58] Field of Search .................................. 23/230 B

[56] References Cited
UNITED STATES PATENTS
2,946,722   7/1960   Hoffman et al. .................... 424/141

OTHER PUBLICATIONS

Emery et al., Chem. Abstr. 49, 11056b (1955).

Kureda et al., Chem. Abstr. 52, 20534a (1958).

*Primary Examiner*—Robert M. Reese
*Attorney, Agent, or Firm*—Christen & Sabol

[57] ABSTRACT

A premix concentrate for addition to animal and poultry feed which consists essentially of gentian violet, which is a selective fungicidal mold inhibitor of *Candida albicans* and the remainder inert ingredients.

Gentian violet is added to poultry drinking water and is used as a poultry water sanitizer.

A process for the analysis of residue gentian violet in manure and a process for the checking of such analytical procedure. A process for the recovery of residue gentian violet in tissue and a process for the checking of such analytical procedure. A process for the recovery of gentian violet from eggs and a process for the checking of such analytical procedure.

22 Claims, No Drawings

ANALYSIS FOR WATER AND FEED ADDITIVES

This application is a continuation-in-part application of my co-pending application Ser. No. 342,290 filed Mar. 16, 1973.

BACKGROUND OF THIS INVENTION

1. Field of This Invention

This invention relates to animal and poultry feeds, poultry drinking water and poultry water sanitizer which contains a selective fungicidal mold inhibitor of *Candida albicans*.

This invention further relates to processes for the analysis of residual gentian violet and/or processes for the checking of such analytical procedures.

2. Prior Art

A mixture of pentamethylpararosaniline chloride and hexamethylpararosaline chloride (gentian violet) has been used in tablet form in human treatment in oxyuriasis where there was no accompanying Ascaris (roundworm) infection and as an efficient and relatively non-toxic anthelmintic in Oxyuris (pin-worm) infectations. Gentian violet has been used internally in humans as an anthelmintic (that is, to expel intestinal worms) and topically on humans as an antimicrobial. A methylrosaniline chloride (gential violet) solution (10 gm. of methylrosaniline chloride, 100 ml. of alcohol and 1000 ml. of water) has been used topically on humans as a local anti-infective. Methylrosaniline chloride tablets have been used internally in humans for intestinal roundworms.

Gentian violet has been used topically on animals as a 0.5 percent aqueous solution or as a one percent alcohol solution for the treatment of burns, chronic ulcers and mycotic skin afflications or used as a 2.5 percent solution in the treatment of contagious pustular dermatitis in sheep.

Hexamethylpararosaline chloride or crystal violet (gentian violet) is a dye, as is pentamethylpararosaniline chloride or methyl violet.

U.S. Pat. No. 2,946,722 discloses a composition consisting essentially of a nontoxic water-soluble salt of propionic acid and lesser amounts of methyl rosaniline, ferric choline citrate, menadione sodium bisulfite and trace-elements (Cu, Co, Mn, Mg, Zn and I) compounds. The compositions usually contains 0.1 to 0.5 percent of methyl rosaniline. The composition is used to treat non-specific diseases in poultry. The examples given of such non-specific diseases were CRD (air-sac infection), enteritis, anemia, gizzard erosion, blue comb and mud fever in turkeys, epidemic tremor and hemorrhagic diseases. Non-specific diseases are defined as those which are not readily identified as being caused by a specific organism. Specific diseases respond to specific treatments, or may be controlled by vaccination. The sodium propionate was used as an antifungal and an antibacterial agent. Methyl rosaniline complements the sodium propionate to provide a higher degree of effectiveness against a broader spectrum of harmful microorganisms. Methyl rosaniline and sodium propionate, in combination with other listed ingredients, are effective to reduce the growth of undesirable microorganisms without materially reducing the growth of and activity of the normal coliform bacteria present in the intestinal tract. The only bacteria in the intestinal tract mentioned as being reduced in number are lactobacilli and entercocci. In sum total, the composition provided a varied coverage of antibacterial, antifungal, anti-anemic, antihemorrhagic, and stress-compensating factors in a well-balanced formula.

The composition of U.S. Pat. No. 2,946,722 can be added to poultry drinking water and can be used as a dry supplement in feeds and the like. A solution can be made by adding 1.6 pounds of the soluble form of the composition to one gallon of water. About ½ pound of the composition can be added to 100 pounds of poultry feed for preventive effect and for remedy of infections in early stages. The treatment at regular levels may be applied continuously. Higher levels of the composition can be used after the disease has become more evident.

U.S. Pat. No. 2,946,722 preferred a free-choice system where the product was in the form of a soft, milk-base food block containing the composition. This preferred free-choice system was based on the individual bird consuming the product as the need arose. Problems with feed and water addition were cited and stressed.

U.S. Pat. No. 3,231,466 discloses a composition for treating animals consisting essentially of a non-toxic, watersoluble salt of propionic acid, methylrosaniline chloride, phthalysulfacetamide, sodium bisulfite, iron, cobalt, and copper choline citrates and a specific organic iodide. The composition is used in treating non-specific diseases and sub-clinical infections. The composition includes the ingredients of U.S. Pat. No. 2,946,722 and several other ingredients.

BROAD DESCRIPTION OF THIS INVENTION

As used herein, the term "poultry" means domestic fowls including chickens, ducks, turkeys, geese, etc.

As used herein, the term "animal" includes domestic pigs, other swine, cattle, sheep, goats, rabbits, etc.

As used herein the term "gentian violet" is hexamethylpararosaniline chloride or a mixture of at least 90 percent of hexamethylpararosaniline chloride with minor portions of pentamethylpararosaniline chloride and/or tetramethylparasosaniline chloride.

Gentian violet is a dark green powder or greenish, glistening pieces with a metallic luster. Gentian violet is soluble in water, chloroform and ethanol.

Other names for gentian violet are methyl rosaniline chloride and crystal violet.

Gential violet inhibits the growth of and destroys *Candida albicans* without materially reducing the growth of and activity of the normal coliform bacteria present in the intestinal tract, which are necessary in synthesizing important nutritional factors.

One aspect of this invention involves the use of gentian violet, a selective fungicidal mold inhibitor, as an additive to poultry feed. The gentian violet specifically is a selective fungicidal mold inhibitor of *Candida albicans*.

This aspect of this invention involves a poultry feed supplement of a food nature, and is a new poultry drug use.

The gential violet is preferably used in the form of a premix concentrate, which can be added to the complete feed as needed. The most preferred premix concentrate contains corn cob fractions, white mineral oil, diatomaceous silica (e.g., Micro-Cel E), distilled water and 1.55 percent of gentian violet.

The concentration of gentian violet in the premix concentrate can easily be as high as 60 percent; it is preferably between 0.1 and 10 percent and is most preferably 1.55 percent. A useful gentian violet premix concentrate is premix ViGen (concentrate) obtainable from A.H.P., Inc., Gainesville, Georgia.

The premix concentrate can contain any material that is used in a complete poultry feed. The premix concentrate can be used in the form of a liquid or solid admixture. The liquid is best in the form of a very viscous suspension or similar semi-fluid. Preferably a solid premix concentrate is used even though it may contain a liquid material such as white mineral oil which reduces the dust factor in the premix.

The premix concentrate is used for treatment of *Candida albicans* by adding it to the complete poultry feed for a period of about 7 days, although the time can be more or less as needed. When the premix concentrate contains 1.55 percent of gentian violet, preferably 2 pounds of the premix is used per ton of complete poultry feed. That reflects a preferred concentration of about 0.00155 percent of gentian violet in the complete poultry feed. Effective concentrations of gentian violet are quite wide, but an example of the range is 0.0001 to 0.01 percent of gentian violet per ton of complete poultry feed.

The above treatment times and concentrations in the complete poultry feed apply even when the gentian violet is directly admixed with the complete poultry feed without going through the intermediate premix concentrate form.

The premix is used for prevention of *Candida albicans* by adding it to the complete poultry feed on a continuous basis. (After treatment with the premix, it should be used on a continuous basis to achieve prevention.) When the premix contains 1.55 percent of gentian violet, preferably 1 pound of the premix is used per ton of complete poultry feed. That reflects a preferred concentration of about 0.00078 percent of gentian violet in the complete poultry feed. Effective concentrations of gentian violet are quite wide, but an example of the range is 0.00005 to 0.005 percent of gentian violet per ton of complete poultry feed.

The above treatment times and concentrations in the complete poultry feed apply even when the gential violet is directly admixed with the complete poultry feed without going through the intermediate premix concentrate form.

Any complete poultry feed or basal poultry feed can be used. It can contain, for example, ground yellow corn, soybean oil meal, steamed bone meal, ground limestone, iodized salt, manganese sulfate, Vitamin A oil, dry Vitamin D-3, riboflavin, Vitamin B-12 and niacin. It can also contain, for example, fish meal and meat meal.

Another aspect of this invention involves the use of gentian violet, a selective fungicidal mold inhibitor, as an additive to animal feed. The gentian violet specifically is a selective fungicidal mold inhibitor of *Candida albicans*.

The gentian violet is preferably used in the form of a premix concentrate, which can be added to the complete feed as needed. The most preferred premix concentrate contains corn cob fractions, white mineral oil, diatomaceous silica (e.g., MicroCel E), distilled water and 1.55 percent of gentian violet.

The concentration of gentian violet in the premix concentrate can easily be as high as 60 percent, it is preferably between 0.1 and 10 percent and is most preferably 1.55 percent. A useful gentian violet premix concentrate is ViGen obtainable from A.H.P., Inc., Gainesville, Georgia.

The premix concentrate can contain any materials that can be used in a basal complete animal feed. The premix concentrate can be used in the form of a liquid or solid admixture. The liquid is best in the form of a very viscous suspension or similar semi-fluid. Preferably a solid premix concentrate is used even though it may contain a liquid material such as white mineral oil which tends to reduce the dust in the premix concentrate.

The premix concentrate is used for treatment of *Candida albicans* by adding it to the complete animal feed for a period of about 7 days, although the time can be more or less as needed. When the premix concentrate contains 1.55 percent of gentian violet, preferably two pounds of the premix is used per ton of complete animal feed that reflects 0.00155 percent gentian violet in complete animal feed. Effective concentrations of gentian violet are quite wide, but an example of the range is 0.0001 to 0.01 percent of gentian violet per ton of complete animal feed.

The above treatment times and concentrations in the complete animal feed apply even when the gentian violet is directly admixed with the complete animal feed without going through the intermediate premix concentrate form.

The premix is used for prevention of *Candida albicans* by adding it to the basal or complete animal feed on a continuous basis. (After treatment with the premix, is should be used on a continuous basis to achieve prevention.) When the premix contains 1.55 percent of gentian violet, preferably one pound of the premix is used per ton of complete animal feed. That reflects a preferred concentration of about 0.00078 percent of gentian violet in the complete animal feed. Effective concentration of gentian violet are quite wide, but an example of the range is 0.00005 to 0.005 percent of gentian violet per ton of complete animal feed.

The above treatment times and concentrations in the complete animal feed apply even when the gentian violet is directly admixed with the complete animal feed without going through the intermediate premix concentrate form.

Any complete animal feed or basal animal feed can be used; it can contain, for example, any of the following ingredients: mogul starch, iodized salt, dry Vitamin D-3, riboflavin, Vitamin B-12, niacin, meat meal, D calcium pantothenate, cracked or milled grains such as corn, wheat, oats, barley and the like, dried molasses, dried sorghum, soybean meal, cottonseed meal, peanut meal, fish meal, essential amino acids such as lysine, peptides and polypeptides containing essential amino acids, cesain, soya bean protein, vitamins such as Vitamins A, D, E and K, mineral nutrients such as sodium chloride, ferrous salts, magnesium sulfate and calcium salts, proteins, buffers, dextrose, sucrose, lactose, maltose, corn syrup solids, hydrolyzed cereal solids, hay, etc.

An exemplary cattle feed is 73 percent rolled shelled corn, 20 percent ground corn cobs, and a supplement containing soybean meal, alfalfa meal, cane molasses, urea, salt, dicalcium phosphate, Vitamin A concentrate and Vitamin D concentrate.

A further aspect of this invention involves the use of gentian violet, a selective fungicidal mold inhibitor, as an additive to poultry water. This aspect of this invention involves a poultry water additive and is a new poultry drug use.

The gentian violet is preferably used in the form of a liquid premix concentrate, which can be added to the poultry water as needed or made into a stock solution and added as needed. The most preferred concentrate contains water and 1.55 percent of gentian violet, but the concentration usually ranges from 0.1 to 10 percent. Although any concentration can be used. The key is to get a sufficiently high concentration in the poultry water itself. The concentration of gentian violet in the poultry water itself should be between 0.001 and 0.1 percent.

A useful gentian violet premix concentrate is ViGen-Soluble (concentrate) obtainable from A.H.P., Inc., Gainesville, Georgia.

The treatment period is preferably 7 days but can be any length of time needed to achieve the desired effect.

The gentian violet can be added directly to the poultry water, in which case the above treatment times and concentrations also apply.

This aspect of this invention can also be used with animals.

Another aspect of this invention involves the use of gentian violet, a selective fungicidal mold inhibitor, as a poultry water sanitizer. It aids in the reduction of Candida albicans contamination in water lines and poultry watering equipment. This aspect of this invention involves a poultry water additive and is a new poultry drug use.

The gentian violet is preferably used in the form of a liquid premix concentrate, which can be added to the poultry water on a regular basis, for example, once a week. It can also be made up into a stock solution and added to the poultry water. The most preferred concentrate contains water and 0.3875 percent of gentian violet, but the concentration usually ranges from 0.05 to 5 percent. Although any concentration can be used. The key is to get a sufficiently high concentration in the poultry water itself. The concentration of gentian violet in the poultry water itself should be between 0.001 and 0.05 percent.

A useful gentian violet premix concentrate is Aqua Gen (concentrate) Water Sanitizer obtainable from A.H.P., Inc., Gainesville, Georgia.

The treatment period is preferably one day every week but can be on any basis as needed to achieve the desired effect.

The gentian violet can be added directly to the poultry water, in which case the above treatment times and concentrations also apply.

This aspect of this invention can also be used with animals.

Another name for *Candida albicans* is *Monila albicans*. *Candida albicans*, a yeast-like organism, is the usual cause of moniliasis pneumonia, meningitis and other forms of moniliasis. It is normally saprophytic but may become pathogenic after the administration of certain antibiotics. Antibiotics are often used in relatively large amounts in animal and poultry feeds. The use of the antibiotics allow molds and fungi to grow. The above processes of this invention are useful in eliminating and preventing internal infestation of *Candida albicans*, for example, in the intestines and infestation of *Candida albicans* in drinking water.

Gentian violet, both as a contaminant in water and as a residue in poultry manure, is biodegradable in the presence of the ultra-violet rays of sunlight.

This invention still further involves a process for the analysis of the residual gentian violet in feed or manure. The process includes extracting substantially all of the fat in the feed or manure using a fat solvent. (The extraction is preferably done at room temperature. The fat solvent is separated from the feed or manure, preferably, by means of centrifuging.) The fat-extracted feed or manure is dried. A known amount of acidified ethanol is admixed with the fat-extracted feed or manure, and the resultant admixture is left standing (preferably for 48 hours). The acidified alcohol is separated from the resultant admixture. The amount of gentian violet in the acidified alcohol is determined by spectrophotometrical comparison with acidified alcohol standards containing set amounts of gentian violet.

The extraction, separation and determination steps are repeated until no gentian violet is found to be present in the acidified alcohol, the total of the gentian violet found from the determination steps being the total amount of gentian violet present in the feed or the manure.

This process is preferably used for analysis of poultry feed or manure.

Preferably the fat extraction step involves first extracting the fat from the manure or feed at least once with petroleum ether and then extracting the fat from the manure or the feed at least once with hexane.

The preferred fat solvent is petroleum ether, when a one step extraction process is used, and is the use of petroleum ether, in the first step and the use of hexane in the second step, when a two step extraction step is used. Other fat solvents can be used.

All or some of said feed is fed to the animals or poultry, a known amount of gentian violet being present in said feed.

The remaining portion, if any, of the feed and after consumption and the manure are separately processed according to this process. The total of the gentian violet found in the remaining portion, if any, of the feed and the manure is compared with the known amount of gentian violet present in the feed before it is fed to the animals or the poultry, the difference being a measure of the gentian violet retained by the animal or the poultry.

The fat extraction is preferably done at room temperature. The fat solvent is preferably separated by means of centrifuging.

Preferably the acidified alcohol contains 1 ml. of concentrated HCl per 100 ml. of ethanol. Other acids such as concentrated sulfuric acid and concentrated nitric acid can be used in place of the concentrated HCl.

Other suitable solvents can be used in place of the acidified alcohol.

The determinations can be made by any conventional method, but preferably are made using a spectrophotometer such as a Turner spectrophotometer.

This process can be used to analyze the amount of the residue of gentian violet in animal or human manure of feed (food).

This invention also involves a process for checking the accuracy of a process for the analysis of residual gentian violet in feed of manure of animal or poultry. The process includes adding a known amount of various aqueous solutions containing known amounts of gentian violet to known amounts of feed or manure known not to contain any gentian violet to form spiked samples. Substantially all of the fat in each of the spiked samples of feed or manure is extracted using a fat solvent. Preferably the fat extraction step involves first extracting the fat from the manure or the feed at least once with petroleum ether and then extracting the fat from the manure or the feed at least once with hexane. A known amount of acidified ethanol is admixed with each of the spiked samples, letting the resultant admixture stand (preferably for 48 hours). Preferably the extraction is done at room temperature. Preferably the acidified alcohol contains 1 ml. of concentrated HCl per 100 ml. of ethanol. Other acids such as concentrated sulfuric acid and concentrated nitric acid can be used in place of the concentrated HCl. The acidified alcohol is separated from each of the resultant admixtures. Preferably the separation is achieved by means of centrifuging. The amount of gentian violet in each of the acidified alcohols is determined by spectrophotometrical comparison with acidified alcohol standards containing varied amounts of gentian violet. The extraction, separation and determination steps are repeated until no gentian violet is found to be present in the acidified alcohol, the total of gentian violet for each sample giving the accuracy of the procedure for the analysis of residual gentian violet in the manure or feed by direct comparison with the known amount of gentian violet placed in each sample.

Other suitable fat solvents can be used in place of the hexane and the acidified alcohol.

The determinations can be made by any conventional method, but preferably are made using a spectrophotometer such as a Turner spectrophotometer.

This process can be used to check or determine the accuracy of the process herein for analyzing the amount of the residue of gentian violet in animal or human manure or feed (food).

A check on the acidified ethanol extraction steps involves using a spiked sample which contains no gentian violet so as to be a blank sample. The acidified ethanol batches from the spiked samples are compared with the acidified ethanol bath from the blank sample.

This invention further involves a process for the analysis of residual gentian violet in tissue. The process includes finely particulating a known amount of tissue, admixing the known amount of tissue, with a known amount of water, and allowing the admixture to stand. The tissue can be, for example, muscle, skin, fat, kidney and liver. The tissue is preferably finely particulated by fine grinding. Preferably the admixture is allowed to stand for 24 hours under refrigeration. The water is then removed from the admixture, preferably by evaporation using a steam bath. Substantially all of the fat in the dried tissue is extracted using a fat solvent. The extraction is preferably done at room temperature, and the preferred fat solvent is petroleum ether. The fat extraction can be repeated one or more times (preferably it is repeated twice). Each time the tissue and petroleum ether are preferably hand shaken for two minutes and then centrifuged to remove the fat solvent and dissolved fat. The fat extraction procedure is then repeated using hexane in place of the above fat solvent. The extraction is preferably done at room temperature. The fat extraction can be repeated one or more times (preferably it is repeated twice). Each time the tissue and hexane are preferably hand shaken for 2 minutes and then centrifuged to remove most of the hexane and dissolved fat. The remaining hexane is removed from the tissue, preferably by placing the tissue in an air jet and evaporating the residual hexane.

The process proceeds with an acid-alcohol extraction of the gentian violet from the tissue. A known amount of acidified ethanol is admixed with the tissue, then letting the resultant admixture stand (preferably at room temperature in the dark for about 24 hours). Preferably the acidified alcohol contains 1 ml. of the concentrated HCl per 100 ml. of ethanol. Other acids such as concentrated sulfuric acid and concentrated nitric acid can be used in place of the concentrated HCl. The acidified alcohol is separated from the resultant admixture (preferably by centrifuging). (The acid-alcohol is repeated until no gentian violet is detected by spectrophotometrical comparison as set forth below.) The amount of gentian violet in the acidified alcohol is determined by spectrophotometrical comparison with acidified alcohol standards containing set amounts of gentian violet; the amount of gentian violet being the residue of gentian violet in the known amount of tissue.

The determinations can be made by any conventional method, but preferably are made using a spectrophotometer such as a Turner spectrophotometer.

This process can be used to analyze the amount of the residue of gentian violet in animal or human tissue (preferably in poultry tissue).

This process also involves a process for checking the accuracy of a process for the analysis of residual gentian violet in tissue. The process includes finely particulating a known amount of tissue known not to contain any gentian violet, admixing the known amount of tissue with a known amount of water, and allowing the admixture to stand. The tissue is preferably finely particulated by fine grinding. Preferably the admixture is allowed to stand for 24 hours under refrigeration. The water is then removed from the admixture, preferably by evaporation using a steam bath. This is the control sample. Spiked samples are prepared following the above procedure to prepare the control sample, but with the following modifications. Instead of using the known amount of water, a known amount of various aqueous solutions containing known amounts of gentian violet is added to several of the known amount of particulated tissue to form spiked samples. Preferably three spiked samples are made. Different strength gentian violet solutions can be used to prepare the spiked samples.

Substantially all of the fat in the dried tissue samples is extracted using a fat solvent. The extraction is preferably done at room temperature, and the preferred fat solvent is petroleum ether. The fat extraction can be repeated one or more times (preferably it is repeated twice). Each time the tissue and petroleum ether are preferably hand shaken for two minutes and then centrifuged to remove the fat solvent and dissolved fat. The fat extraction procedure is then repeated using hexane in place of the above fat solvent. The extraction is preferably done at room temperature. The fat extraction can be repeated one or more times (preferably it is repeated twice). Each time the tissue and the hexane are preferably hand shaken for 2 minutes and then centrifuged to remove most of the hexane and dissolved fat. The remaining hexane is removed from the tissue, preferably by placing the tissue in an air jet and evaporating the residual hexane.

The process proceeds with an acid-alcohol extraction of the gentian violet from the tissue samples. A known amount of acidified ethanol is admixed with each of the tissue samples. Preferably the acidified alcohol contains 1 ml. of concentrated HCl per 100 ml. of ethanol. Other acids such as concentrated sulfuric acid and concentrated nitric acid can be used in place of the concentrated HCl. The resultant admixtures are allowed to stand (preferably at room temperature in the dark for about 24 hours. The acidified alcohol is separated from each of the resultant admixtures (preferably by centrifuging). (The acid-alcohol is repeated until no gentian violet is detected by spectrophotometrical comparison as set forth below.). The amount of gentian violet in each of the acidified alcohol batches is determined by spectrophotometrical comparison with acidified alcohol standards containing varied amounts of gentian violet. The amount of gentian violet for each sample gives the accuracy of the procedure for the analysis of residual gentian violet in tissue by direct comparison with the known amount of gentian violet placed in each sample.

The determinations can be made by any conventional method, but preferably are made using a spectrophotometer such as a Turner spectrophotometer.

This process can be used to check or determine the accuracy of the process herein for analyzing the amount of the residue of gentian violet in animal or human tissue (preferably in poultry tissue).

This invention further involves a process for the analysis of residual gentian violet in eggs (particularily poultry eggs, and more particularily in chicken eggs). The process includes admixing a known amount of eggs (usually whole eggs) with a known amount of water, and allowing the admixture to stand. Preferably the admixture is allowed to stand for 24 hours under refrigeration. The water is then removed from the admixture, preferably by evaporation using a steam bath. Substantially all of the fat in the dried eggs homogenate is extracted using a fat solvent. The extraction is preferably done at room temperature, and the preferred fat solvent is petroleum ether. The fat extraction can be repeated one or more times (preferably it is repeated twice). Each time the egg and petroleum ether are preferably hand shaken for 2 minutes and then centrifuged to remove the fat solvent and dissolved fat. The fat extraction procedure is then repeated using hexane in place of the above fat solvent. The extraction is preferably done at room temperature. The fat extraction can be repeated one or more times (preferably it is repeated twice). Each time the egg and hexane are preferably hand shaken for two minutes and then centrifuged to remove most of the hexane and dissolved fat. The remaining hexane is removed from the egg, preferably by placing the egg in an air jet and evaporating the residual hexane.

The process proceeds with an acid-alcohol extraction of the gentian violet from the egg. A known amount of acidified ethanol is admixed with the egg, then letting the resultant admixture to stand (preferably at room temperature in the dark for about 24 hours). Preferably the acidified alcohol contains 1 ml. of concentrated HCl per 100 ml. of ethanol. Other acids such as concentrated sulfuric acid and concentrated nitric acid can be used in place of the concentrated HCl The acidified alcohol is separated from the resultant admixture (preferably by centrifuging). (The acid-alcohol is repeated until no gentian violet is detected by spectrophotometrical comparison as set forth below.) The amount of gentian violet in the acidified alcohol is determined by spectrophotometrical comparison with acidified alcohol standards containing set amounts of gentian violet; the amount of gentian violet being the residue of gentian violet in the known amount of egg.

The determinations can be made by any conventional method, but preferably are made using a spectrophotometer such as a Turner spectrophotometer.

This process can be used to analyze the amount of the residue of gentian violet in eggs.

This process also involves a process for checking the accuracy of a process for the analysis of residual gentian violet in eggs.

The process includes admixing a known amount of egg known not to contain any gentian violet, with a known amount of water, and allowing the admixture to stand. Preferably the admixture is allowed to stand for 24 hours under refrigeration. The water is then removed from the admixture, preferably by evaporation using a steam bath. This is the control sample. Spiked samples are prepared following the above procedure to prepare the control sample, but with the following modifications. Instead of using the known amount of water, a known amount of various aqueous solutions containing known amounts of gentian violet is added to several of the known amount of egg to form spiked samples. Preferably three spiked samples are made. Different strength gentian violet solutions can be used to prepare the spiked samples.

Substantially all of the fat in the dried egg samples is extracted using a fat solvent. The extraction is preferably done at room temperature, and the preferred fat solvent is petroleum ether. The fat extraction can be repeated one or more times (preferably it is repeated twice). Each time the tissue and petroleum ether are preferably hand shaken for two minutes and then centrifuged to remove the fat solvent and dissolved fat. The fat extraction procedure is then repeated using hexane in place of the above fat solvent. The extraction is preferably done at room temperature. The fat extraction can be repeated one or more times (preferably it is repeated twice). Each time the egg and the hexane are preferably hand shaken for 2 minutes and then centrifuged to remove most of the hexane and dissolved fat. The remaining hexane is removed from the egg, preferably by placing the egg in an air jet and evaporating the residual hexane.

The process proceeds with an acid-alcohol extraction of the gentian violet from the egg samples. A known amount of acidified ethanol is admixed with each of the egg samples. Preferably the acidified alcohol contains 1 ml. of concentrated HCl per 100 ml. of ethanol. Other acids such as concentrated sulfuric acid and concentrated nitric acid can be used in place of the concentrated HCl. The resultant admixtures are allowed to stand (preferably at room temperature in the dark for about 24 hours). The acidified alcohol is separated from each of the resultant admixtures (preferably by centrifuging). (The acid-alcohol is repeated until no gentian violet is detected by spectrophotometrical comparison as set forth below.) The amount of gentian violet in each of the acidified alcohol batches is determined by spectrophotometrical comparison with acidified alcohol standards containing varied amounts of gentian violet. The amount off gentian violet for each sample gives the accuracy of the procedure for the analysis of residual gentian violet in egg by direct comparison with the known amount of gentian violet placed in each sample.

The determination can be made by any conventional method, but preferably are made using a spectrophotometer such as a Turner spectrophotometer.

This process can be used to check or determine the accuracy of the process herein for analyzing the amount of the residue of gentian violet in eggs (particularily poultry eggs, and more particularily in chicken eggs).

DETAILED DESCRIPTION OF THIS INVENTION

The following examples illustrate this invention.

EXAMPLE 1

Chickens infected with *Candida albicans* were fed, for seven days, a complete poultry feed containing 2 pounds of premix concentrate per ton of complete poultry feed. The premix concentrate contained 1 percent of white mineral oil, 1.65 percent of Micro-Cel E, 1.55 percent of gentian violet, 91.8 percent of corn cob fractions and 4 percent of water. The complete poultry feed contained:

| Ingredients | lb/100 lb. |
|---|---|
| Ground yellow corn | 64.5 |
| Soybean oil meal (50% protein) | 32.0 |
| Steamed bone meal | 2.0 |
| Ground limestone | 1.0 |
| Iodized salt | 0.5 |
| | gm/100 lb |
| Manganese sulfate (feed grade) | 11.4 |
| Vitamin A oil (10,000 I.U./gm | 22.7 |
| Dry Vitamin D-3 (1,6550 I.C.U./gm | 22.7 |
| Riboflavin | 0.15 |
| Vitamin B-12 (3 mg. lb.) | 45.4 |
| Niacin | 1.0 |

EXAMPLE 2

The chickens of Example 1 were fed thereafter a complete poultry feed containing one pound of the premix concentrate described in Example 1 per ton of complete poultry feed (described in Example 1).

EXAMPLE 3

A series of trials were conducted to evaluate the efficacy of gentian violet on an artifically induced outbreak of Candidiasis in broilers. This organism was obtained from a clinical case of crop mycosis; grown in liquid Sabaurads media and diluted to contain one million organisms per dose. Crop swabs were taken when the birds were 7 days, 14 days, and 21 days of age and grown on Sabaurads media. Groups of the broilers were fed at levels of 1 pound of gentian violet per ton of feed, 2 pounds of gentian violet per ton of feed, and 5 pounds of gentian violet per ton of feed. Controls were run against other products and against no treatment. (The other products were copper sulfate, Mycostatin, Mold Curb, sodium propionate and calcium propionate.) The birds fed gentian violet had a marked decreasse of Candida recovery when compared to the no treatment controls. The birds started on the gentian violet containing feed had the lowest incidence of Candida recovery when compared to the controls using the other products and had weights on about the same level as some non-infected non-treated controls (although there was a slight weight depression at the 5 pound per ton level).

EXAMPLE 4

Hogs infected with Candida albicans were fed, for 7 days, a complete hog feed containing 2 pounds of premix concentrate per ton of complete hog feed. The premix contained 1 percent of white mineral oil, 1.65 percent of Micro-Cel E, 1.55 percent of gentian violet, 91.8 percent of corn cob fractions and 4 percent of water. The complete hog feed was the same as the one used in Example 1.

EXAMPLE 5

The hogs of Example 4 were fed thereafter a complete hog feed containing 1 pound of the premix concentrate (described in Example 4) per ton of complete hog feed (described in Example 4).

EXAMPLE 6

240 ml. of a premix concentrate containing water and 1.55 percent of gentian violet were diluted to make 1 gallon of stock solution and a number of gallons of water were metered through a proportioner, at ratio of 1 ounce of stock solution per gallon of water, to poultry drinking trays as needed over a 7-day period.

EXAMPLE 7

Example 1 was repeated using the following chicken feed:

| Ingredient: | Weight Percent |
|---|---|
| Assay protein ADM | 35.00 |
| Wheat middlings | 40.91 |
| Fishmeal (menhaden) | 8.40 |
| Corn distillers solubles | 3.00 |
| Dehydrated alfalfa meal | 3.00 |
| Calcium carbonate | 2.90 |
| Dicalcium phosphate | 2.90 |
| Choline concentrate (25%) | 1.10 |
| MHA[1] | 0.70 |
| Glycine | 0.30 |
| Vitamins B and K | 0.50 |
| Iodized salt | 0.50 |
| Aureomycin concentrate | 0.14 |
| Penicillin concentrate | 0.14 |
| Coccidistat | 0.12 |
| Nitrofurazone concentrate | 0.06 |
| Vitamin A (10,000 IU/g.) | 0.08 |
| Vitamin D (7500 ICU/g.) | 0.30 |
| Trace mineral mixture | 0.20 |
| Santoquin[2] | 0.02 |
| Corn oil | 0.70 |
| Total | 100.00 |

[1]Registered trademark for calcium salt of 2-hydroxy-4-methylthiobutyric acid.

[2]Registered trademark for an antioxidant, G-ethoxy-2,2,4-trimethyl-1,2-dihydroquinoline.

EXAMPLE 8

Chickens were fed feed containing 14 ppm (twice the recommended dosage) of gentian violet for 31 days. No toxic effects were observed and tests showed a gentian violet recovery from the manure and residual feed of over 99 percent; this establishes the safety of using gentian violet (at the levels disclosed herein) in chicken feed.

EXAMPLE 9

Example 1 was repeated using the following turkey feed:

|  | Pounds |
|---|---|
| Ground yellow corn | 1105 |
| Soybean meal (50% protein) | 540 |
| Animal fat (stabilized No. 2 tallow) | 100 |
| Menhaden fish meal | 60 |
| Fish solubles, condensed (50% solids) | 40 |
| Alfalfa leaf meal (20% protein) | 60 |
| Dicalcium phosphate (20% P, 24% Ca) | 40 |
| Oyster shell flour | 19.9 |
| Salt | 10 |
| Vitamin Premix | 20 |

EXAMPLE 10

240 ml. of a premix concentrate containing water and 0.3875 percent gentian violet were diluted to make 1 gallon of stock solution. The gallon of stock solution and a number of gallons of water were metered through a proportioner, at a ratio of 1 ounce of stock solution per gallon of water delivered. The gential violet addition was done one day every week.

EXAMPLE 11

FEEDING AND HANDLING OF THE CHICKENS IN THE TECHNIQUE FOR GENTIAN VIOLET EXTRACTION FROM MANURE AND FEED

Chickens were placed in individual isolation cages. One control chicken was designated for each two chickens placed on the gentian violet medicated feed. Feed for each individual chicken was prepared containing the proper amount of gentian violet (14 ppm). Feed slightly in excess of the amount each chicken would consume in a 7-day feeding period was prepared. Each chicken was fed exclusively from the container of feed prepared for it. At the end of the 7-day feeding period the feed was withdrawn and the chickens retained in the fasting stage for an additional 2 days to insure maximum emptying of the digestive system. At the end of the 2-day fasting period the chickens were removed from the cages and sacrificed. All waste feed in the cage dropping pan and feed cup was carefully removed and added to the portion of the feed unconsumed by the particular chicken during the 7-day feeding period. This total residue feed sample was then extracted to determine the amount of gentian violet not consumed by the individual chicken. This is an essential determination in that the peculiar feeding habits of chickens allow for concentration of the gentian violet particles in the unconsumed feed. It is necessary to know what portion of the gentian violet added to the feed, when the feed is prepared, remains in the feed at completion of the feeding period. All droppings were removed from the dropping pan and the cage floor was scraped and brushed to collect the maximum amount of manure produced by the chicken. Droppings were weighed, air-dried, and ground according to the instructions set forth below in the Gentian Violet Extraction procedure for extraction of gentian violet from manure.

PREPARATION OF FEED CONTAINING VIGEN PREMIX CONCENTRATE FOR TEST CHICKENS

Leghorn type chickens approximately 20 weeks of age were used for the trial. These birds consume approximately 0.2 lb (75–90 gm) of feed per day. Slightly more feed was prepared than it is anticipated each bird would consume in 7 days. The feed for each test bird in the trial was prepared as an individual batch.

1 lb. (454 gm batches) of 14 ppm gentian violet feed were prepared as such:

| Weigh | 0.454 gm of ViGen premix concentrate |
|---|---|
| Weigh | 453.546 gm of feed |
|  | 454.000 gm of admixture |

The ViGen premix concentrate contained corn cob fractions, white mineral oil, diatomaceous silica (i.e., Micro-Cel E), and 1.55 percent of gentian violet. The feed described in Example 1 was used in preparing the gentian violet feed. The feed containing ViGen premix concentrate was placed in a one quart canning jar (or other suitable glass container) and a Number 10 rubber stopper was inserted in each jar. The screw caps were secured tightly on the jars and the contents were hand mixed (turn-and-shake movement) for 15 minutes to insure uniform distribution of the ViGen throughout the feed.

The medicated feed should not be mixed in a metal or plastic container or mixer as gentian violet has a tendency to adhere to metal and plastic surfaces that are not well grounded. This may result in loss of proper concentration of gentian violet in the feed during perparation.

The following is a calculation of gentian violet concentrations in feed medicated with the ViGen premix concentrate: 1 ton (2,000 lbs) of ViGen premix concentrate contains 31 lbs (14,074 gm) of gentian violet with guaranteed activity of 96% purity (USP standard). 1 lb (454 gm) of ViGen premix concentrate contains 7 gm of gentian violet (7 gm × 96% = 6.72 gm guaranteed active). 1 lb (454 gm) of ViGen premix concentrate in 1 ton of complete feed provides 227 mg (.227 gm) of ViGen premix concentrate per pound of complete feed. 227 mg ViGen premix concentrate per pound of complete feed provides 3.5 mg of gentian violet per poiun of complete feed × 7 ppm in that feed. 454 mg ViGen premix per pound of complete feed = 14 ppm in that feed. This is equivalent to .0148 mg gentian violet per gram of feed.

So the gentian violet activity in the feed can be calculated as .0148 mg of gentian violet per gram of feed when working at the 14 ppm level.

GENTIAN VIOLET EXTRACTION PROCEDURE i. Preparation of manure samples

Each entire wet manure sample was weighed, in an open glass pan and air dried in the dark until consistency of the sample would allow grinding in a mortar. Each entire sample was ground with mortar and pestle to the finest possible particle size. Each finely ground manure sample was placed in the glass pan again and air dried in the dark to a constant weight. A control manure sample known not to contain any gential violet was also subjected to this procedure, control and medicated manure samples were handled in exactly the same manner. The dry weight of each manure sample was recorded. Each dry manure sample was placed in a one quart stoppered container (1 quart fruit jar), and a Number 10 rubber stopper was placed in each jar with the sample. Each jar was tightly capped and hand mixed for 15 minutes to insure a homogenous mixture in each jar. The control and medicated samples were mixed in separate containers.

ii. Preparation of feed samples

Special handling of the feed is not required when making gential violet extractions from feed except that residual feed should be thoroughly mixed prior to weighing samples. It is necessary to have at hand a sample of the unmedicated feed to use as a control when working with the gentian violet medicated feed. The gentian violet in the feed samples was extracted using the technique for manure extraction starting with the following fat extraction step and carried out the rest of the entire extraction procedure. Calculations were made in the same manner as listed for the manure.

iii. Fat extraction procedure

One 10 gm sample of the control manure was weighed and placed in a 100 ml centrifuge tube. Six 10 gm samples of each of the medicated manure samples were weighed and placed in six 100 ml centrifuge tubes. 60 ml of petroleum ether were added to each of the seven centrifuge tubes and the tubes were sealed tightly with rubber stoppers. Each tube was hand shaken for 2 minutes. The rubber stoppers were removed from the tubes and any solid material adhering to the stopper was flushed into the centrifuge tube using a minimum of petroleum ether. The tubes were placed in a centrifuge and centrifuged for 5 minutes at 2,000 rpm. The petroleum ether from the centrifuged samples was decanted and discarded. The petroleum ether washing (or extraction) was repeated three times.

Upon completion of the petroleum ether washings, 60 ml of hexane were added to each sample in the centrifuge tubes. The tubes were stoppered and hand shaken for 2 minutes. The solid particles were washed from the stoppers into the tubes. The tubes were placed in a centrifuge and centrifuged for 5 minutes at 2,000 rpm. The liquid was decanted and discarded. The hexane washings (or extraction) was repeated three times. After completion of the hexane washings, the centrifuged samples were placed in an air jet and evaporated for 30 minutes.

The air dried samples from the centrifuge tubes were transfered to 250 ml flasks equipped with ground glass stoppers. The tubes were flushed with sufficient petroleum ether to remove all solid matter from the tubes. The flasks were placed in an air jet and the samples were evaporated until dry (i.e., no detectable odor of petroleum ether).

iv. Acid-alcohol extraction of gential violet

Acid-alcohol solution containing 100 ml of ethyl alcohol (denatured 95%) plus 1 ml concentrated HCl were prepared. (4 ml acid-alcohol per gram of sample to be extracted were used). 40 ml of acid-alcohol were added to each of the samples in the flasks. A small size magnet was inserted into each flask. The flasks were loosely stoppered and the samples were mixed on a magnetic mixer for 30 minutes. At the end of the 30 minute mixing period, the flasks were set in the dark and let stand for 48 hours to digest the samples. After completion of the 48 hours digestion period, the samples were set on the magnetic mixer and again mixed for 30 minutes. The liquid from the flasks were decanted into centrifuge tubes, making sure to drain all liquid possible from the solids in each flask. The liquid samples were centrifuged for 5 minutes at 2,000 rpm.

v. Reading of the samples

A portion of the control samples and each of the medicated samples were decanted into cuvettes. A spectrophotometer (Turner) was zeroed using the control sample to blank out all color in the solution attributable to the feed ingredients contained in the control manure sample. After the spectrophotometer has been zeroed with the control sample, the optical density of each of the medicated samples was read at 590 mu. The optical density of each medicated sample and the ml (volume) of acid-alcohol used to extract each sample were recorded. Each extraction of each sample was individually calculated as mcg/ml × ml for each individual extraction. (Do not combine the samples and read as a unit.)

(If on this initial reading, the medicated samples read in the optical density range of 0.800 to 1.000, dilute the control and medicated samples in the cuvettes 1:1 with acid-alcohol, zero the spectrophotometer again and re-read the optical density (O.D.) of the medicated samples. Note: the dilution and when calculating this first extraction:, multiply the (mcg) of gentian extracted by 2.)

vi. Second extraction

The acid-alcohol solutions from the first extraction were discarded. The solids from the centrifuge tubes were washed into the flasks using an aliquot of 40 ml of acid-alcohol solution. The flask was placed on the magnetic mixer and mixed for 30 minutes. The liquid from the flasks were decanted into clean centrifuge tubes making sure each sample was well-drained. Each sample was centrifuged for 5 minutes at 2,000 rpm. A portion of each centrifuged liquid was decanted into a cuvette and second readings as in the first extraction were made on the spectrophotometer. Always zero the spectrophotometer with the control sample before reading the O.D. of the medicated samples. (It should not be necessary to dilute this second extraction prior to reading optical density.) The extraction procedure was continued until a 0.000 optical density reading was obtained for each of the medicated samples. One additional extraction was run on each 0.000 optical density sample to insure that the sample was actually zeroed out.

Calculation of gentian violet extraction 1 ppm = 1 µg (or mcg)/ml.

A standard curve for gentian violet in acid-alcohol was prepared (such as the one prepared from the standard solutions of Example 11 13). The optical density for 1 ppm was determined from the standard curve.

$$\frac{\text{O.D. of sample}}{\text{O.D. of 1 ppm (from curve)}} \times \frac{\text{mls of acid-EtOH used for the extraction}}{} =$$
µg (or mcg) gentian violet recovered per extraction Each extraction was separately calculated. All extractions for each sample run were totaled to arrive at the total µug of gentian violet extracted from each sample.

The total µug extracted from all samples were totaled and divided by the number of samples in order to determine the average ug extracted.

$$\frac{\text{gm (air dry) in total manure sample}}{\text{10 gm (am't used in each sample extracted)}} = \frac{\text{number of 10 gm samples in total air dry manure sample.}}{}$$

Average µg per 10 gm sample × number of 10 gm sample = total µg of gentian violet extracted from manure sample. (convert to mg.)

mg in feed (prepared for trial) − mg recovered (from residual feed) = mg consumed by bird.

$$\frac{\text{mg recovered from manure}}{\text{mg consumed by the bird}} = \%\text{ gentian violet recovered from the manure of the bird.}$$

The above example represents the preferred embodiment of this aspect of this invention.

EXAMPLE 12

A feed identical to that of Example 11 and in the same amount was used. 193.5 gm residual feed remaining at end of trial for each pound of starting feed. The feed contained 14 ppm gentian violet when prepared. 50% of the feed was extracted for representative concentration in total feed sample.

$$\frac{96.75 \text{ gm}}{6} = 16.125 \text{ gm per sample}$$

16.125 gm × 4 ml acid-alcohol/gm = 65 ml acid-alcohol to be used per extraction

One 16.125 gm control feed sample sample and six 16.125 gm medicated feed samples were weighed. Petroleum ether and hexane washes were carried out as per Example 11. The samples were suspended in 65 ml of acid-alcohol, mixed and digested for 48 hours. After the digestion period the samples were again mixed, centrifuged and decanted into cuvettes and read at 590 mu on a Turner spectrophotometer. Initial readings exceeded 1.000 optical density, therefore, the samples in the cuvettes were diluted 1:1 with acid-alcohol and re-read. (Notation was made to multiply the $\mu$g/ml extraction by 2 to compensate for the 1:1 dilution.)

| | | | SAMPLE NO. | | | | ml ac-EtOH Used |
|---|---|---|---|---|---|---|---|
| | 1 | 2 | 3 | 4 | 5 | 6 | |
| 1 | .715 | .655 | .620 | .660 | .665 | .640 | 65 ml(×2 for dilution) |
| 2 | .318 | .300 | .282 | .300 | .300 | .278 | 65 ml |
| Extrac- 3 | .094 | .094 | .090 | .084 | .090 | .089 | 65 ml |
| tion 4 | .024 | .021 | .017 | .024 | .025 | .029 | 65 ml |
| No. 5 | .005 | .000 | .000 | .008 | .010 | .011 | 65 ml |
| 6 | .000 | .000 | .000 | .000 | .000 | .000 | |
| 7 | .000 | | | .000 | .000 | .000 | |

Calculation: $\frac{\text{O.D.*sample}}{\text{O.D. 1 ppm (from Std. curve)}} \times$ ml ac-EtOH = $\mu$g gentian violet per extraction

*O.D. means optical density.

Total $\mu$g.
1. 2.563 × 130 = 333.19
2. 1.140 × 65 = 74.10
3. 0.337 × 65 = 21.91
4. 0.086 × 65 = 5.59
5. 0.018 × 65 = 1.17

435.96 $\mu$g gentian violet recovered from No. 1 sample of 16.125 gm feed.

Samples 2, 3, 4, 5, and 6 were calculated in exactly the same manner.

Calculations:

$$\frac{\text{O.D. sample}}{\text{O.D. 1 ppm (from std. curve)}} \times \text{ml ac-EtOH} =$$

$\mu$g gentian violet per extraction recovered per extraction

Sample No.
$\frac{.715}{.279} \times$ 130 ml ac-EtOH = 2.563 × 130 = 33.19 $\mu$g (2×65)

$\frac{.318}{.279} \times$ 65 ml ac-EtOH = 1.140 × 65 = 74.10 $\mu$g $\frac{.094}{.279} \times$ 65 ml ac-EtOH = 0.337 × 65 = 21.91 $\mu$g $\frac{.024}{.279} \times$ 65 ml ac-EtOH = .086 × 65 = 5.59 $\mu$g .005 × 65 ml ac-EtOH = .018 × 65 = 1.17 $\mu$g 435.96 $\mu$g recovered from sample No. 1

Samples 2, 3, 4, 5 and 6 were calculated in the same manner. The $\mu$g extracted for the 6 samples were averaged. The high and low samples were averaged. The high and low samples were deleted and the remaining 4 samples were averaged for agreement.

average of 6 samples = 403.98 $\mu$g gentian violet recovered/sample average of 4 samples = 402.09 $\mu$g gentian violet recovered/sample $$\frac{193.5 \text{ gm feed}}{16.125 \text{ gm/sample}} = 12 \text{ samples of } 16.125 \text{ each.}$$

402.09 $\mu$g × 12 samples = 4825 =g/193.5gm feed sample = 4.825 mg gentian violet recovered from 193.5 residual feed. 193.5gm = 2864 $\mu$g = 2.864mg gentian violet calculated to be in the residual feed.

4825mg − 2.864mg = 1.961 mg gentian violet retained in the feed due to feeding habits of birds.

681 gm feed (14ppm) prepared for trial.

681 gm × .0148 mg/gm feed = 10.08 gentian violet in 681 gm/feed.

mg in feed (prepared for trial) − mg recovered (from residual feed) = mg consumed by bird to be recovered in droppings.

10.08 mg - 4.825 mg = 5.255 mg gentian violet consumed by bird to be recovered in droppings.

The gentian violet extraction from the dropping as per the above instructions, extraction from the feed were calculated as above; and the total gentian violet recovered from dropping calculated.

$$\frac{\text{mg recovered from droppings}}{\text{mg consumed by bird}} = \frac{\% \text{ gentian violet recovered}}{\text{droppings of the bird}}$$

EXAMPLE 13

Example 12 was repeated, except the spiked samples of poultry feed and manure were prepared and used in place of actual poultry feed and manure samples. A control was used, i.e., a blank. Solutions of 10.0, 5.0, 4.0, 3.0, 2.0, 1.0, 0.5, 0.25 and 0.0 (blank) mcg of gentian violet per milliliter of water were prepared and added to 5 gm. of first the feed and then the manure in order to prepare spiked samples. These samples were treated as in Example 12. The final spectrophotometric readings served as a method of checking the accuracy of the analysis process of Example 12. This example represents the preferred embodiment of this aspect of this invention.

EXAMPLE 14

There was an error in the method of calculation of the percentage of recovery in Example 12 which reduces the calculation of the total amount of gentian violet recovery (this is a calculation matter and does not effect the analysis process or process of checking accuracy of such). In a manure and feed experiment of this nature, it is impossible to recover 100 percent of the feed wasted by the bird. It is impossible to collect and retain almost 100 percent of the manure, as some loss will ensue in the drying and grinding of the manure. The amount of gentian violet assigned to "consumed by bird" must take into consideration the experimental error loss of gentian violet in the preparation of the feed and manure samples. In the method of this invention, the total of the gentian violet recovered from the residual feed and the manure are compared to the total dosage in the feed. This calculation allows the small fraction of gential violet unaccounted for to be assigned to the experimental error inherent in any experimental test procedure. (For example, the calculation technique of Example 12 would result in a 94.34 percentage recovery of gentian violet from chicken manure). At this point it should be pointed out that the samples should be protected from ultra-violet radiation in order to prevent gentian violet degradation. When the total gentian violet recovery from residual feed and manure was compared to the total gentian violet mixed in the feed, the percentage accounted for exceeded 99.5 percent.

Leghorn type laying hens 29 weeks of age were utilized in this experiment. The hens were housed, fed and the manure and residual feed samples were collected in accordance with the procedure set out in Example 10. All of the conditions and procedures contained in Example 12 were duplicated to insure accumulation of valid comparative and supportive data.

Gentian violet was fed to the chickens as ViGen (A.H.P. Inc. brand of gentian violet, 1.55%) at 14 ppm × 7 days.

A summary of the basic experimental data was:
Feed prepared —908 gm containing 13.44 mg gential violet (i.e. 14ppm)
Residual feed —545 gm calculated to contain 8.036 mg gentian violet
Feed consumed —363 gm calculated to contain 5.402 mg gentian violet
Manure (air dry)—165 gm

A sample calculation of quantitative gentian violet extraction from chicken feed was:

| EXTRACTION | SAMPLE 1 – 20 | |
|---|---|---|
| 1 | $\frac{.810}{.270} \times 80$ ml = | 240.000 μg |
| 2 | $\frac{.203}{.270} \times 80$ ml = | 60.148 μg |
| 3 | $\frac{.100}{.270} \times 80$ ml = | 29.630 μg |
| 4 | $\frac{.045}{.270} \times 80$ ml = | 13.333 μg |
| 5 | $\frac{.025}{.270} = 80$ ml = | 7.407 μg |
| 6 | $\frac{.019}{.270} = 80$ ml = | 5.630 μg |
| 7 | $\frac{.013}{.270} = 80$ ml = | 3.852 μg |
| | | 360.000 μg |

Actual recovery of gentian violet data was:

| Residual feed | 545 gm | 9.825 mg gentian violet |
|---|---|---|
| Manure (air dry) | 165 gm | 3.550 mg gentian violet |
| | | 13.375 mg gentian violet accounted for |

The total of gentian violet recovered from the residual feed and manure was calculated and compared to the total gentian violet administered in the feed, as follows:

$$\frac{13.375 \text{ mg gentian violet accounted for}}{13.440 \text{ mg gentian violet mixed in feed}} = 99.51\%$$

99.51% of the gentian violet was accounted for either in residual feed or manure recovery. This data further confirms the conclusion that gentian violet is quantitatively recoverable.

EXAMPLE 15

0.104 gm of gentian violet powder, USP were weighed and quantitatively transfered to a 1,000 ml volumetric flask and brought up to 1,000 ml with distilled water. The solution was mixed for 1 hour on a magnetic mixer. This stock solution contained 100 μg of gentian violet per ml of distilled water. 1.0 ml of the stock solution was pipetted into a 100 ml volumetric flask and brought up (q.s.) to 100 ml with distilled water. The solution was hand shaken for 5 minutes. The solution contained 1 μg of gentian violet per ml of distilled water (1 μg/ml = 1 ppm).

Throughout the entire procedure, the gentian violet solutions were protected from sunlight since genetian violet decomposes on exposure to sunlight.

An acid-alcohol solution was prepared by adding 6.0 ml of concentrated HCl to 600 ml of ethyl alcohol (95% denatured).

Using the 100μg/ml stock solution previously prepared, the following dilutions were made:

0.25ml of stock solution q.s. to 100ml with acid alcohol = .25ppm
0.50ml of stock solution q.s. to 100ml with acid alcohol = .50 ppm
1.00ml of stock solution q.s. to 100ml with acid alcohol = 1.00ppm
1.50ml of stock solution q.s. to 100ml with acid alcohol = 1.50ppm
2.00 ml of stock solution q.s. to 100ml with acid alcohol = 2.00ppm The optical density (O.D.) of these 5 standard dilutions of gentian violet in acid alcohol was determined spectrophotometrically. The optical density readings were recorded, and a graph of O.D. vs. ppm (ug%) was plotted to establish linearity of the gentian violet curve. Five standard dilutions were enough to establish this linearity. The O.D. of the 1 ppm gentian violet in acid alcohol standard was recorded on the work sheet for use in the final calculations of the gentian violet recovery.

Fresh aqueous stock solutions of 100 ppm and 1 ppm should be prepared each time tissues are to be spiked. Standard dilutions of gentian violet in acid alcohol should be made and a new curve prepared each time tissues are to be spiked.

A chicken was fed the poultry feed and premix concentrate of Example 1 for a period of time.

Portions of the tissues (muscle, skin, fat, kidney and liver) of the chicken were finely ground in a Waring blender. Four 5 gm samples of the combined tissues were weighed into individual 250ml Erlenmeyer flasks. 5 ml of distilled water were added to each sample and the samples were stirred to form a slurry. The tissues samples were placed in the refrigerator to react for 24 hours. At the end of the 24 hour reaction period, the samples were placed on a steam bath and the water evaporated from the samples. The tissue samples were protected from excessive heat by placing each sample flask in a beaker of water.

20ml of petroleum ether were added to each sample flask. The tissue in each flask was loosened with a glass stirring rod and the tissue and ether poured into a 100 ml glass centrifuge tube. Each flask was washed with 2 additional 20 ml aliquots of petroleum ether to remove all tissue possible from each flask, adding each aliquot of petroleum ether to the tissue in the centrifuge tube. Each 250ml flask was saved to receive the tissues when the hexane washing was completed. Each centrifuge tube was stoppered and the contents hand shaken for 2 minutes. Each stopper was removed and any adherent tissue particles flushed into each centrifuge tube using a minimum of petroleum ether. The samples were centrifuged at 2,000 rpm for 5 minutes. Each petroleum ether solution was decanted and discarded. A second 60ml aliquot of petroleum ether was added to the tissue in each centrifuge tube. Each tube was stoppered, hand shaken for 2 minutes and centrifuged. Each petroleum ether solution was decanted and discarded as above. The petroleum ether wash was repeated twice for a total of three washes.

60 ml of hexane was added to each tissue sample in the centrifuge tube and the petroleum ether washing procedure was repeated for a total of three hexane washes, discarding the hexane after each washing. The hexane washed samples were placed in an air jet and the residual hexane evaporated (no detectable odor of hexane from the samples).

Each hexane evaporated tissue sample was returned to its original flask retained for this purpose. Five 10 ml aliquots (50 ml total) of acid-alcohol were used to wash each tissue sample from the centrifuge tube into the corresponding sample flask and a 1 inch magnet was inserted into each flask. Each flask was stoppered with a rubber stopper. Each sample flask was placed on a magnetic mixer and stirred for 1 hour. Each sample was removed from the mixer and set in the dark to digest for 24 hours. After 24 hours of digestion of the samples in acid-alcohol, the sample flasks were placed on the magnetic mixer and again mixed for 1 hour. Each mixture was decanted into a 60 ml glass centrifuge tube and each was centrifuged at 2,000 rpm for 10 minutes. 5 ml of each of the centrifuged supernatant were pipetted into a 13 × 100 ml curvette.

A Turner spectrophotometer was set at 590 mu. The spectrophotometer was zeroed using a control blank which had been processed as above, but the chieken had not beed fed any gentian violet. The optical density of each of the samples was read on the spectrophotometer and recorded. The acid-alcohol extraction process was repeated for each sample until two consecutive 0.000 O.D. readings confirmed that all gentian violet had been extracted from each tissue sample.

The formula for calculation of the recovered gentian violet is:

$$\frac{O.D. \text{ of sample}}{O.D. \text{ of 1 ppm from standard}} \times \frac{\text{ml acid alcohol}}{\text{used in extraction}} = \mu g \text{ of gentian violet recovered}$$

Each extraction is calculated separately. The $\mu g$ of gentian violet recovered from each tissue sample was totalled, giving the amount of gentian violet contained in each tissue sample. This illustrates the process of this invention determining the amount of residual gentian violet in tissue.

EXAMPLE 16

PROCESS FOR THE CHECKING OF THE ACCURACY OF THE PROCESS FOR DETERMINING THE QUANTITATIVE RECOVERY OF GENTIAN VIOLET FROM SPIKED TISSUE SAMPLES

Preparation of gentian violet aqueous solutions 0.104 gm of gentian violet powder, USP were weighed and quantitatively transferred to a 1,000 ml volumetric flask and brought up to 1,000 ml with distilled water. The solution was mixed for 1 hour on a magnetic mixer. This stock solution contained 100 $\mu g$ of gentian violet per ml of distilled water. 1.0 ml of the stock solution was pipetted into a 100 ml volumetric flask and brought up (q.s.) to 100 ml with distilled water. The solution was hand shaken for 5 minutes. The solution contained 1 $\mu g$ of gentian violet per ml of distilled water (1 $\mu g$/ml = 1ppm).

Throughout the entire procedure, the gentian violet solutions were protected from sunlight since gentian violet decomposes on exposure to sunlight.

Preparation of gentian violet-acid alcohol standard solutions

An acid alcohol solution was prepared by adding 6.0 ml of concentrated HCl to 600 ml of ethyl alcohol (95% denatured).

Using the 100$\mu g$/ml stock solution previously prepared, the following dilutions were made:

0.25ml of stock solution q.s. to 100ml with acid alcohol = .25ppm 0.50ml of stock solution q.s. to 100ml with acid alcohol = .50ppm 1.00ml of stock solution q.s. to 100ml with acid alcohol = 1.00ppm 1.50ml of stock solution q.s. to 100ml with acid alcohol = 1.50ppm 2.00ml of stock solution q.s. to 100ml with acid alcohol = 2.00ppm The optical density (O.D.) of these five standard dilutions of gentian violet in acid alcohol was determined spectrophotometrically. The optical density readings were recorded, a graph of O.D. vs. ppm (ug%) was plotted to establish linearity of the gentian violet curve. Five standard dilutions were enough to establish this inlearity. The O.D. of the 1 gentian violet in acid alcohol standard was recorded on the work sheet for use in the final calculations of the gentian violet recovery.

Fresh aqueous stock solutions of 100 ppm and 1 ppm should be prepared each time tissues are to be spiked. Standard dilutions of gentian violet in acid alcohol should be made and a new curve prepared each time tissues are to be spiked.

Preparation of the tissue samples

Portions of the poultry tissues (muscle, skin, fat, kidney and liver) to be tested were finely ground in a Waring blender. Four 5 gm samples of the combined tissues were weighed into individual 250ml Erlenmeyer flasks. One sample was designated as the control and three samples were designated as spiked samples. Using the 1 $\mu g$/ml (1ppm) aqueous gentian violet stock solution, 0.5 ml were pipetted into 3 of the sample flasks, 4.5 ml of distilled water were added and the samples were stirred to form a slurry.

0.5 ml of 1ppm gentian violet/5 gm of tissue = 0.1ppm 5.0 ml of distilled water were added to the control blank and stirred as above. The control blank and the 3 spiked tissue samples were placed in the refrigerator to react for 24 hours. At the end of the 24 hour reaction period, the samples were placed on a steam bath and the water evaporated from the samples. The tissue samles were protected from excessive heat by placing each sample flask in a beaker of water.

Extraction of Gential Violet From Spiked Tissue Samples

Petroleum ether washing of the sample

20mml of petroleum ether were added to each sample flask. The tissue in each flask was loosened with a glass stirring rod and the tissue and ether poured into a 100 ml glass centrifuge tube. Each flask was washed with 2 additional 20 ml aliquots of petroleum ether to remove all tissue possible from each flask, adding each aliquot of petroleum ether to the tissue in the centrifuge tube. Each 250ml flask was saved to receive the tissues when the hexane washing was completed. Each centrifuge tube was stoppered and the contents hand shaken for 2 minutes. Each stopper was removed and any adherent tissue particles flushed into each centrifuge tube using a minimum of petroleum ether. The samples were centrifuged at 2,000 rpm for 5 minutes. Each petroleum ether solution was decanted and discarded. A second 60ml aliquot of petroleum ether was added to the tissue in each centrifuge tube. Each tube was stoppered, hand shaken for 2 minutes and centrifuged. Each petroleum ether solution was decanted and discarded as above. The petroleum ether wash was repeated twice for a total of three washes.

Hexane washing of the samples

60ml of hexane was added to each tissue sample in the centrifuge tube and the petroleum ether washing procedure was repeated for a total of 3 hexane washes, discarding the hexane after each washing. The hexane washed samples were placed in an air jet and the residual hexane evaporated (no detectable odor of hexane from the samples).

Acid-alcohol wash to extract the gentian violet from tissues

Each hexane evaporated tissue sample was returned to its original flask retained for this purpose. Five 10 ml aliquots (50 ml total) of acid-alcohol were used to wash each tissue sample from the centrifuge tube into the corresponding sample flask and a 1 inch magnet was inserted into each flask. Each flask was stoppered with a rubber stopper. Each sample flask was placed on a magnetic mixer and stirred for 1 hour. Each sample was removed from the mixer and set in the dark to digest for 24 hours. After 24 hours of digestion of the samples in acid-alcohol, the sample flasks were placed on the magnetic mixer and again mixed for 1 hour. Each mixture was decanted into a 50 ml glass centrifuge tube and each was centrifuged at 2,000 rpm for 10 minutes. 5 ml of each of the centrifuged supernatant were pipetted into a 13 × 100 ml curvette.

A Turner spectrophotometer was set at 590 mu. The spectrophotometer was zeroed using the control blank. The optical density of each of the spiked samples was read on the spectrophotometer and recorded. The acid-alcohol extraction process was repeated for each sample until two consecutive 0.000 O.D. readings confirmed that all gentian violet had been extracted from each tissue sample.

Calculation of gentian violet recovery

The formula for calculation of the recovered gentian violet is:

$$\frac{\text{D.D. of sample}}{\text{O.D. of 1 ppm from standard solution}} \times \frac{\text{ml acid alcohol}}{\text{used in extraction}}$$

$$= \mu\text{g of gentian violet recovered}$$

Each extraction is calculated separately. The μg of gentian violet recovered from each tissue sample was totalled and compared to the amount of gentian violet added as a spike to each tissue. This illustrates the process of this invention of checking the accuracy of the process of determining the amount of residual gentian violet in tissue.

EXAMPLE 17

The purpose of this experiment was to determine the feasibility of recovery of a known amount of gentian violet added as a spike to tissue samples. The procedure of Example 16 was used.

Tissues (muscle, skin, fat, kidney and liver) from hens that had not ingested gentian violet were selected for this experiment. Tissues were prepared in accordance with Example 16. 0.5 ml of a 1 ppm (1 μg/ml) aqueous gentian violet standard solution and 4.5 ml of distilled water were added to each of three 5 gm tissue samples. Each spiked tissue sample was then placed on a magnetic mixer and mixed for 1 hour. The mixed samples were placed in the refrigerator to react for 24 hours. A blank control was prepared by weighing one 5 gm aliquot of the same tissue sample and adding 5 ml of distilled water. The blank control was mixed and refrigerated in the same manner as the spiked samples. Upon completion of the 24 hour reaction period, the blank and spiked samples were placed on a steam bath and the water evaporated prior to commencing extraction procedures. The evaporated samples (blank and spiked) were subjected to the extraction processes, as outlined in Example 16, in preparation for spectrophotometric analysis. Portions of the centrifuged acid-alcohol solutions were transferred to 13 × 100 mm curvettes. The spectrophotometer was zeroed using the blank control, and then each spiked sample was read and the optical density (O.D.) recorded. Repeated acid-alcohol extractions of the samples were made until the spectrophotometer recorded two .000 O.D. readings for each spiked sample indicating that all detectable gentian violet had been recovered from the samples. The concentration of gentian violet in μg/ml for each extraction was calculated and the total μg of gentian violet recovered from each spiked sample determined. The μg of gentian violet recovered from each spiked sample was compared to the known amount added to each sample.

The actual mathematical relationship is expressed by the following equation:

$$\frac{\text{O.D. of sample}}{\text{O.D. of standard}} \times 1.0\ \mu\text{g/ml acid-alcohol} \times \text{ml acid-alcohol}$$

$$= \mu\text{g gentian violet recovered.}$$

Calculation of gentian violet recovery from spiked tissue samples is as follows:

| Extraction | Sample 1 - 5gm tissue |
|---|---|
| 1 | $\frac{.003}{.238} \times 50\text{ml} = 0.63\ \mu\text{g}$ |
| 2 | .000 |
| 3 | .000 |
| Extraction | Sample 2 - 5gm tissue |
| 1 | $\frac{.002}{.238} \times 50\text{ml} = 0.42\ \mu\text{g}$ |
| 2 | .000 |
| 3 | .000 |
| Extraction | Sample 3 - 5gm tissue |
| 1 | $\frac{.002}{.238} \times 50\text{ml} = 0.42\ \mu\text{g}$ |
| 2 | .000 |
| 3 | .000 |

A summary of the results is given below:

| Sample | 1 – 5 gm tissue | |
|---|---|---|
| | gentian violet spike | 0.50 μg |
| | gentian violet recovery | 0.63 μg |
| Sample | 2 – 5 gm tissue | |
| | gentian violet spike | 0.50 μg |
| | gentian violet recovery | 0.42 μg |
| Sample | 3 – 5 gm tissue | |
| | gentian violet spike | 0.50 μg |
| | gentian violet recovery | 0.42 μg |

Spectrophotometric readings obtained from the tissues (muscle, skin, fat, kidney and liver) demonstrated that gentian violet in spiked tissue samples is recoverable, and that the process for checking the accuracy is valid.

EXAMPLE 18

Five Leghorn type laying hens, 27 weeks of age, were selected for this test. Three hens were designated for medication and two hens were retained as negative controls. Feed containing gentian violet was prepared. The birds were housed and feed. Gentian violet was fed to laying hens as ViGen (A.H.P. Inc. brand of gentian violet, 1.55%) at the rate of 14 ppm × 7 days. The hens utilized were sacrificed and the appropriate tissues (muscle, skin, fat, kidney and liver) were collected and appropriately identified. The tissues were subjected to the procedure of Example 15. The tissues were collected and examined spectrophotometrically for gentian violet residues according to the procedure of Example 15.

For the first test bird, the feed prepared weighed 908 gm and contained 13.44mg gentian violet, which is 14 ppm. The residual feed weighed 163 gm, so the first test bird consumed 745 gm of feed. Three tissue samples (muscle, skin, fat, liver and kidney) of 5 grams each were prepared. Spectrophotometric analysis results for gentian violet residue in the hen tissue was:

| SAMPLE No. | O.D. of extraction 1 | O.D. of extraction 2 |
|---|---|---|
| Control | | |
| 1 | .000 | .000 |
| Medicated | | |
| 1 | .000 | .000 |
| 2 | .000 | .000 |
| 3 | .000 | .000 |

For the second test bird, the feed prepared weighed 908 gm and contained 13.44 mg gentian violet, which is 14 ppm. The residual feed weighed 112 gm, so the second test bird consumed 796 gm of feed. Three tissue samples (muscle, skin, fat, liver and kidney) of 5 grams each were prepared. Spectrophotometric analysis for gentian violet residue in the hen tissue was:

| Sample No. | O.D. of extraction 1 | O.D. of extraction 2 |
|---|---|---|
| Control | | |
| 1 | .000 | .000 |
| Medicated | | |
| 1 | .000 | .000 |
| 2 | .000 | .000 |
| 3 | .000 | .000 |

For the third test bird, the feed prepared weighed 908 gm and containing 13.44 mg gentian violet, which is 14 ppm. The residual feed weighed 296.8 gm, so the third test bird consumed 611.2 gm of feed. Three tissue samples (muscle, skin, fat, liver and kidney) of 5 grams each were prepared. Spectrophotometric analysis for gentian violet residue in the hen tissue was:

| Sample No. | O.D. of extraction 1 | O.D. of extraction 2 |
|---|---|---|
| Control | | |
| 1 | .000 | .000 |
| Medicated | | |
| 1 | .000 | .000 |
| 2 | .000 | .000 |
| 3 | .000 | .000 |

For the first control bird, the feed prepared weighed 908 gm. The residual feed weighed 331.8 gm, so the first control bird consumed 576.2 gm of feed. Three tissue samples (muscle, skin, fat, liver and kidney) of 5 grams each were prepared. For the second control bird, the feed prepared weighed 908 gm. The residual feed weighed 197.8 gm, so the second control bird consumed 710.02 gm of feed. Three tissue samples (muscle, skin, fat, liver and kidney) of 5 grams each were prepared.

One of the purposes of this experiment was to determine if gentian violet ingested by the test hens could be detected in the tissues of these hens. Based on the data complied from this example, the conclusion is that ingested gentian violet does not produce residues in tissues even when fed for prolonged periods at treatment level.

This experiment was repeated twice and the same results were obtained.

EXAMPLE 19

0.104 gm of gentian violet powder, USP, was weighed and quantitatively transfer to a 1,000 ml volumetric flask and brought up (q.s.) to 1,000 ml with distilled water. The solution was mixed for 1 hour on a magnetic mixer. The stock solution contained 100 μg of gentian violet per ml of distilled water. 1.0 ml of the stock solution was pipetted into a 100 ml volumetric flask and q.s. to 100 ml with distilled water. The solution was hand shaken for 5 minutes. The solution contained 1 μg of gentian violet per ml of distilled water (1 μg/ml = 1 ppm).

Throughout the entire procedure, the gentian violet solutions were protected from sunlight, since gentian violet decomposes on exposure of sunlight.

An acid alcohol solution was prepared by adding 6.0 ml of concentrated HCl to 600 ml of ehtyl alcohol (95% denatured).

Using the 100µg/ml stock solution previously prepared, the following dilutions were made:

0.25ml of stock solution q.s. to 100ml with acid alcohol = .25ppm 0.50ml of stock solution q.s. to 100ml with acid alcohol = .50 ppm 1.00ml of stock solution q.s. to 100ml with acid alcohol = 1.00ppm 1.50ml of stock solution q.s. to 100ml with acid alcohol = 1.50ppm 2.00ml of stock solution q.s. to 100ml with acid alcohol = 2.00ppm The optical density (O.D.) of these five standard dilutions of gentian violet in acid alcohol was determined spectrophotometrically. The optical density readings were recorded and a graph of O.D. vs. ppm (µg%) was plotted to establish linearity of the of the gentian violet curve. Five standard dilutions were enough to establish this linearity. The O.D. of the 1 ppm gentian violet in acid alcohol standard was recorded on the work sheet for the use in the final calculations of the gentian violet recovery.

Fresh aqueous stock solutions of 100 ppm and 1 ppm should be prepared each time eggs are to be tested. Standard dilutions of gentian violet in acid alcohol should be made and a new curve prepared each time eggs are to be tested.

Four eggs were taken from a chicken who had been fed the poultry feed and premix concentrate of Example 1 for a period of time.

The four whole eggs (yolk and white) were broken into a Waring blender. The eggs were blended for 5 minutes and poured into a 250ml flask. Four 10 gm aliquots of the blended egg sample were weighed into individual 100 ml beakers. 10 ml of distilled water were added to each flask and the samples stirred to form a slurry. The egg samples were placed in the refrigerator to react for 24 hours. At the end of the 24 hour reaction period, the samples were placed on a steam bath and the water evaporated from the samples. The egg samples were protected from excessive heat by placing each sample beaker in a beaker of water.

20 ml of petroleum ether were added to each sample beaker. The egg in each beaker was loosened with a glass stirring rod and the egg and ether poured into a 100ml glass centrifuge tube. Each beaker was washed with two additional 20 ml aliquots of petroleum ether to remove all sample possible from each beaker, adding each aliquot of petrolleum ether to the egg sample in the centrifuge tube. Each 100 ml beaker was saved to receive the egg samples when the hexane washing was completed. Each centrifuge tube was stoppered and the contents hand shaken for 2 minutes. Each stopper was removed and any adherent egg particles flushed into each centrifuge tube using a minimum of petroleum ether. The samples were centrifuged at 2,000 rpm for 5 minutes. The petroleum ether solution was decanted and discarded. A second 60 ml aliquot of petroleum ether was added to the egg sample in each centrifuge tube. Each tube was stoppered, hand shaken for 2 minutes and centrifuged. Each petroleum ether solution was decanted and discarded as above. The petroleum ether washing was repeated twice for a total of 3 washes.

60 ml of hexane was added to each egg sample in the centrifuge tube and the petroleum ether procedure was repeated for a total of three hexane washes, discarding the hexane after each washing. The hexane washed samples were placed in an air jet and the residual hexane evaporated (no detectable odor of hexane from the samples).

Each hexane evaporated egg sample was returned to its original beaker retained for this purpose. Four 10 ml aliquots (40 ml of total) of acid alcohol were used to wash each egg sample from the centrifuge tube into the corresponding sample beaker and a 1 inch magnet was inserted into each flask. Each beaker was stoppered with a rubber stopper. Each sample beaker was placed on a magnetic mixer and mixed for 1 hour. Each sample was removed from the mixer and set in the dark to digest for 24 hours. After 24 hours of digestion of the samples in acid-alcohol, the sample flasks were placed on the magnetic mixer and again mixed for 1 hour. Each mixture was decanted into a 50 ml glass centrifuge tube and each was centrifuged at 2,000 rpm for 10 minutes. 5 ml of each of the centrifuged supernatant was pipetted into a 13 × 100 ml cuvette. A Turner spectrophotometer was set at 590 mµ. The spectrophotometer was zeroed using a control blank which had been processed as above, but the chicken had not been feed any gentian violet. The optical density (O.D.) of each of the egg samples was read on the spectrophotometer and recorded. The acid-alcohol extraction procedure was repeated for each sample until 2 consecutive .000 readings confirmed that all gentian violet had been extracted from each egg sample.

The formula for calculation of the recovered gentian violet is:

$$\frac{\text{O.D. of sample}}{\text{O.D. of 1 ppm from standard curve}} \times \frac{\text{ml acid alcohol}}{\text{used for extraction}} = \mu\text{g of gentian violet recovered}$$

Each extraction is calculated separately. The µg of gentian violet recovered from each egg sample was totaled, giving the amount of gentian violet contained in each egg sample. This illustrates the process of this invention of determining the amount of residual gentian violet in whole eggs.

EXAMPLE 20

PROCESS FOR THE CHECKING OF THE ACCURACY OF THE PROCESS FOR DETERMINING THE QUANTITATIVE RECOVERY OF GENTIAN VIOLET FROM SPIKED EGG SAMPLES 0.104 gm of gentian violet powder, USP, was weighed and quantitatively transfer to a 1,000 ml volumetric flask and brought up (q.s.) to 1,000 ml with distilled water. The solution was mixed for 1 hour on a magnetic mixer. This stock solution contained 100 µg of gentian violet per ml of distilled water. 1.0 ml of the stock solution was pipetted into a 100 ml volumetric flask and q.s. to 100 ml with distilled water. The solution was hand shaken for 5 minutes. The solution contained 1 g of gentian violet per ml of distilled water (1 $\mu$g/ml = 1 ppm).

Throughout the entire procedure, the gentian violet solutions were protected from sunlight, since gentian violet decomposes on exposure of sunlight.

Preparation of gentian violet-acid alcohol standard solutions

An acid alcohol solution was prepared by adding 6.0 ml of concentrated HCl to 600 ml of ethyl alcohol (95% denatured).

Using the 100$\mu$g/ml stock solution previously prepared, the following dilutions were made:

0.25ml of stock solution q.s. to 100ml with acid alcohol = .25ppm 0.50ml of stock solution q.s. to 100ml with acid alcohol = .50ppm 1.00ml of stock solution q.s. to 100ml with acid alcohol = 1.00ppm 1.50ml of stock solution q.s. to 100ml with acid alcohol = 1.50ppm 2.00ml of stock solution q.s. to 100ml with acid alcohol = 2.00ppm The optical density (O.D.) of these five standard dilutions of gentian violet in acid alcohol was determined spectrophotometrically. The optical density readings were recorded and a graph of O.D. vs. ppm ($\mu$g%) was plotted to establish linearity of the gentian violet curve. Five standard dilutions were enough to establish this linearity. The O.D. of the 1 ppm gentian violet in acid alcohol standard was recorded on the work sheet for use in the final calculations of the gentian violet recovery.

Fresh aqueous stock solutions of 100 ppm and 1 ppm should be prepared each time eggs are to be spiked. Standard dilutions of gentian violet in acid alcohol should be made and a new curve prepared each time eggs are to be spiked.

Preparation of egg samples

Four whole eggs (yolk and white) were broken into a Waring blender. The eggs were blended for 5 minutes and poured into a 250ml flask. Four 10 gm aliquots of the blended egg samples were weighed into individual 100 ml beakers. One aliquot was marked as the control and three aliquots were designated for being spiked with gentian violet. Using the 1$\mu$g/ml (1 ppm) aqueous gentian violet stock solution, 1.0 ml was pipetted into each of the three sample beakers, 9 ml of distilled water were added and the samples stirred to form a slurry. 10 ml of distilled water was added to the control blank and stirred as above. The control blank and the three spiked egg samples were placed in the refrigerator to react for 24 hours. At the end of the 24 hour reaction period, the samples were placed on a steam bath and the water evaporated from the samples. The egg samples were protected from excessive heat by placing each sample beaker in a beaker of water.

Extraction of Gentian Violet from Spiked Egg Samples

Petroleum ether washing of the samples 20 ml of petroleum ether were added to each sample beaker. The egg in each beaker was loosened with a glass stirring rod and the egg and ether poured into a 100 ml glass centrifuge tube. Each beaker was washed with two additional 20ml aliquots of petroleum ether to remove all sample possible from each beaker, adding each aliquot of petroleum ether to the egg sample in the centrifuge tube. Each 100ml beaker was saved to receive the egg samples when the hexane washing was completed. Each centrifuge tube was stoppered and the contents hand shaken for 2 minutes. Each stopper was removed and any adherent egg particles flushed into each centrifuge tube using a minimum of petroleum ether. The samples were centrifuged at 2,000 rpm for 5 minutes. The petroleum ether solution was decanted and discarded. A second 60 ml aliquot of petroleum ether was added to the egg sample in each centrifuge tube. Each tube was stoppered, hand shaken for 2 minutes, and centrifuged. Each petroleum ether solution was decanted and discarded as above. The petroleum ether washing was repeated twice for a total of three washes.

Hexane washing of the samples 60 ml of hexane was added to each egg sample in the centrifuge tube and the petroleum ether procedure was repeated for a total of three hexane washes, discarding the hexane after each washing. The hexane washed samples were placed in an air jet and the residual hexane evaporated (no detectable odor of hexane from the samples).

Acid-alcohol wash to extract gentian violet from eggs

Each hexane evaporated egg sample was returned to its original beaker retained for this purpose. Four 10 ml aliquots (40 ml total) of acid alcohol were used to wash each egg sample from the centrifuge tube into the corresponding sample beaker and a 1 inch magnet was inserted into each flask. Each beaker was stoppered with a rubber stopper. Each sample beaker was placed on a magnetic mixer and mixed for 1 hour. Each sample was removed from the mixer and set in the dark to digest for 24 hours. After 24 hours of digestion of the samples in acid-alcohol, the sample flasks were placed on the magnetic mixer and again mixed for 1 hour. Each mixture was decanted into a 50 ml glass centrifuge tube and each was centrifuged at 2,000 rpm for 10 minutes. 5 ml of each of the centrifuged supernatant was pipetted into a 13 × 100 ml cuvette.

A Turner spectrophotometer was set at 590 mu. THe spectrophotometer was zeroed using the control blank. The optical density (O.D.) of each of the spiked samples was read on the spectrophotometer and recorded. The acid-alcohol extraction procedure was repeated for each sample until 2 consecutive .000 readings confirmed that all gentian violet had been extracted from each egg sample.

Calculation of gentian violet recovery

The formula for calculation of the recovered gentian violet is:

$$\frac{\text{O.D. of sample}}{\text{O.D. of 1 ppm from standard curve}} \times \frac{\text{ml acid alcohol}}{\text{used for extraction}} = \mu\text{g of gentian violet recovered}$$

Each extraction is calculated separately. The $\mu$g of gentian violet recovered from each egg sample was totaled and compared to the amount of gentian violet added as a spike to each egg samples. This illustrates the process of this invention of checking the accuracy of the process of determining the amount of residual gentian violet in whole eggs.

EXAMPLE 21

The purpose of this experiment was to determine the feasibility of recovery of a known amount of gentian violet added as a spike to whole eggs. The procedure of Example 20 was used.

Whole eggs produced by hens that had not ingested gentian violet were selected for this experiment. Whole eggs were broken out and homogenized in a Waring blender. Three 10 gm aliquots of the homogenized whole egg sample were weighed. 1.0 ml of a 1ppm (1 $\mu$g/ml) aqueous gentian violet standard solution and 9.0 ml distilled water was added to each 10 gm aliquot of egg sample (three egg samples). Each spiked egg sample was then placed on a magnetic mixer and mixed for 1 hour. The mixed samples were placed in the refrigerator to react for 24 hours. A blank control was prepared by weighing one 10 gm aliquot of the same egg sample and adding 10 ml of distilled water. The blank control was mixed and refrigerated in the same manner as the spiked samples. Upon completion of the 24 hour reaction period the blank and spiked samples were placed on a steam bath and the water evaporated prior to commencing extraction procedures. The evaporated samples (blank and spiked) were subjected to the extraction processes, as outlined in Example 16, in preparation for spectrophotometric analysis. Portions of the centrifuged acid-alcohol solutions were transferred to 13 × 100 cuvettes. The spectrophotometer was zeroed using the blank control and then each spiked sample read and the optical density (O.D.) recorded. Repeated acid alcohol extractions of the samples were made until the spectrophotometer recorded two .000 O.D. readings for each spiked sample indicating that all detectable gentian violet had been recovered from the samples. The concentrations of gentian violet in $\mu$g/ml for each extraction was calculated and the total $\mu$g of gentian violet recovered from each spiked sample determined. The $\mu$g of gentian violet recovered for each spiked sample was compared to the known amount added to each sample to arrive at the percentage recovery figures.

The actual mathematical relationship is expressed by the following equation: O.D. of sample/O.D. of standard × 1.0 $\mu$g/ml acid-alcohol × ml acid-alcohol = $\mu$g gentian violet recovered.

Calculation of gentian violet recovery from spiked whole egg samples is as follows:

| Extraction | Sample 1 - 10gm egg |
|---|---|
| 1 | $\frac{.006}{.280}$ × 40ml = 0.88 $\mu$g |
| 2 | .000 |
| 3 | .000 |
| Extraction | Sample 2 - 10gm egg |
| 1 | $\frac{.007}{.280}$ × 40ml = 1.00 $\mu$g |
| 2 | .000 |
| 3 | .000 |
| Extraction | Sample 3 - 10gm egg |
| 1 | $\frac{.007}{.280}$ × 40ml = 1.00 $\mu$g |
| 2 | .000 |
| 3 | .000 |

A summary of the results is given below:

| Sample | 1 – 10 gm egg | |
|---|---|---|
| | Gentian violet spike | 1.00 $\mu$g |
| | Gentian violet recovery | 0.88 $\mu$g |
| Sample | 2 – 10 gm egg | |
| | Gentian violet spike | 1.00 $\mu$g |
| | Gentian violet recovery | 1.00 $\mu$g |
| Sample | 3 – 10 gm egg | |
| | Gentian violet spike | 1.00 $\mu$g |
| | Gentian violet recovery | 1.00 $\mu$g |

Spectrophotometric readings obtained from the spiked whole egg samples demonstrated that gentian violet in spiked egg samples is recoverable, and that the process for checking the accuracy is valid.

EXAMPLE 22

Five Leghorn type laying hens, 27 weeks of age, were selected for this test. Three hens were designated for medication and two hens were retained as negative controls. Feed containing gentian violet was prepared. The birds were housed and fed. Gentian violet was fed to laying hens as ViGen (A.H.P. Inc. brand of gentian violet, 1.55%) at the rate of 14 ppm × 7 days. Eggs were collected daily and identified with the number assigned to the individual hen. Eggs were retained in refrigerated storage until completion of the full test feeding period. Eggs were also collected and saved for 72 hours after completion of the feeding period, since previous studies have indicated that ingested gentian violet is excreted within 72 hours post-feeding. Six eggs from each hen were divided into two groups of three eggs each. One group of three eggs was broken, homogenized and weighed for whole egg samples. The second group of three eggs was broken and the yolks and the whites separated into individual containers and weighed. Residue data was then compiled on egg yolk, egg white and whole eggs for each of the individual hens. Three 10gm aliquots of each egg sample were weighed and subjected to extraction procedures according to the procedure of Example 20. The egg samples were subjected to spectrophotometric analysis at 590 m$\mu$ in a Turner spectrophotometer using 13 × 100 mm cuvettes. (according to the procedure of Example 20).

For the first test bird, the feed prepared weighed 908 gm and contained 13.44 mg gentian violet, which is 14 ppm. The residual feed weighed 163 gm, so that the first bird consumed 745 gm of feed. The three test eggs had: a weight whole eggs (3) of 132.5 gm; a weight egg yolks (3) of 48.57 gm; and a weight egg whites (3) of 90.79 gm.

Spectrophotometric analysis results for gentian violet residues in the whole egg samples was:

| Sample No. | O.D. of extraction 1 | O.D. of extraction 2 |
|---|---|---|
| Control | | |
| 1 | .000 | .000 |
| Medicated | | |
| 1 | .000 | .000 |
| 2 | .000 | .000 |
| 3 | .000 | .000 |

Spectrophotometric analysis results for gentian violet residues in the egg yolk samples was:

| Sample No. | O.D. of extraction 1 | O.D. of extraction 2 |
| --- | --- | --- |
| Control | | |
| 1 | .000 | .000 |
| Medicated | | |
| 1 | .000 | .000 |
| 2 | .000 | .000 |
| 3 | .000 | .000 |

Spectrophotometric analysis results for gentian violet residues in the egg white samples was:

| Sample No. | O.D. of extraction 1 | O.D. extraction 2 |
| --- | --- | --- |
| Control | | |
| 1 | .000 | .000 |
| Medicated | | |
| 1 | .000 | .000 |
| 2 | .000 | .000 |
| 3 | .000 | .000 |

Based on the data compiled from this example, the conclusion is that ingested gentian violet does not produce residues in eggs even when fed for prolonged period at treatment level.

EXAMPLE 23

Example 22 was repeated. Leghorn type laying hens 35 weeks of age were used in this test. The hens were fed the medicated feed for a 9 day feeding period. The eggs produced during this period were utilized in this trail.

For the first test bird, the feed prepared weighed 908 gm and contained 13.44 mg gentian violet, which is 14 ppm. The residual feed weighed .000 gm, so that the first bird consumed 908 gm of feed. The three test eggs had: a weight whole eggs (3) of 120 gm; a weight egg yolks (3) of 48.5 gm; and a weight egg whites (3) of 72.9 gm.

Spectrophotometric analysis results for gentian violet residues in the whole egg samples was:

| Sample No. | O.D. of extraction 1 | O.D. of extraction 2 |
| --- | --- | --- |
| Control | | |
| 1 | .000 | .000 |
| Medicated | | |
| 1 | .000 | .000 |
| 2 | .000 | .000 |
| 3 | .000 | .000 |

The gentian violet ingested by the test hens was not detected in the whole eggs produced by these hens.

EXAMPLE 24

Example 22 was repeated, except for the following exceptions. Leghorn type hens of 25 weeks of age was placed on medicated feed (14 ppm) and the feeding period prolonged to a total of 31 days to determine if excessive feeding (4 1/2 × recommended treatment period) at 14 ppm could produce evidence of residue in eggs. The hens were observed for the entire 31 day feeding period for any indications of adverse effects on physical condition or egg production which might be attributable to excessive medication. Ten eggs per hen were utilized to increase the number of egg samples and provide additional supportive data.

For the first test bird, the feed prepared weighed 2,724 gm and contained 40.32 mg gentian violet, which is 14 ppm. The residual feed weighed .0000 gm, so the first bird consumed 2,724 gm of feed. The test eggs had: a weight whole eggs (5) of 202.2 gm; a weight egg yolks (5) of 81.0 gm; and a weight egg whites (5) of 121.5 gm.

Spectrophotometric analysis results for gentian violet residues in the whole eggs samples was:

| Sample No. | O.D. extraction 1 | O.D. extraction 2 |
| --- | --- | --- |
| Control | | |
| 1 | .000 | .000 |
| Medicated | | |
| 1 | .000 | .000 |
| 2 | .000 | .000 |
| 3 | .000 | .000 |

The data serves to further confirm the absence of gentian violet residue in eggs from hens that have ingested gentian violet, even when the feeding period is extended to 31 days (4 1/2 times the recommended treatment period) at 14 ppm in the feed. The absence of adverse effects from prolonged treatment level (14 ppm × 31 days) feeding of the hens indicated an adequate margin of safety for ingested gentian violet.

EXAMPLE 25

A ViGen premix formulation was prepared which had the following components: 1.55 percent of ViGen (gentian violet from A.H.P. Inc); 1 percent of white mineral oil, NF-70 Food Grade, from Standard Oil Co.; 1.65 percent of Micro-Cel E, synthetic calcium silicate Code 21-E, from the Celite Division of Johns-Manville Products Co., 91.8 percent of Grit-O-Cob, Grade 2040 corn cob fractions, from Anderson Cob Mills, Inc. and 4 percent of distilled water. The corn cobs and calcium silicate are inert carriers; white oil reduces the dust in the premix and distilled water is the solvent for the gentian violet for adsorption of the gentian violet onto the inert carriers. The ViGen premix formulation was found to be stable for over one year.

EXAMPLE 26

In the feed, it was found that 0.00155% of gentian violet was a good treatment level and that 0.000775% of gentian violet was a good prevention level.

What is claimed is:

1. A process for the analysis of the residual gentian violet in tissue which comprises:
   a. finely particulating a known amount of tissue;
   b. admixing a known amount of finely particulated tissue and a known amount of water;
   c. allowing the admixture to stand;
   d. evaporating or removing the water from the admixture;
   e. extracting essentially all of the fat in the finely particulated tissue using a fat solvent;
   f. extracting essentially all of the fat remaining in the finely particulated tissue using hexane;
   g. evaporating or removing the hexane from the finely particulated tissue;
   h. admixing a known amount of acidified ethanol with the finely particulated tissue, and letting the resultant admixture stand;
   i. separating the acidifed alcohol from the resultant admixture; and j. determining the amount of gentian violet in the acidified alcohol by spectrophotometrical comparison with acidified alcohol standards containing set amounts of gentian violet, the determined amount of gentian violet being the residue of gentian violet in the known amount of tissue.

2. A process as described in claim 1 wherein the fat solvent is petroleum ether.

3. A process as described in claim 1 wherein step (g) is achieved by centrifugation.

4. A process as described in claim 1 wherein step (e) is repeated twice, wherein step (f) is repeated twice, and wherein steps (h), (i) and (j) are repeated until the acidified alcohol from that sequence of steps (h), (i) and (j) contains no gentian violet, the residue of gentian violet in the known amount of tissue being the total of the determined amount of gentian violet in the acidified alcohol from each sequence of steps (h), (i) and (j).

5. A process for checking the accuracy of a process for the analysis of the residue gentain violet in tissue which comprises:
  a. preparing a known amount of finely particulated tissue known not to contain any gentian violet;
  b. admixing one or more batches of the particulated tissue with a known amount of an aqueous solution containing a known amount of gentian violet, each aqueous solution containing a different known amount of gentian violet to form spiked samples;
  c. extracting substantially all of the fat in each of the spiked samples using a fat solvent;
  d. extracting essentially all of the fat remaining in the spiked samples using hexane;
  e. evaporating or removing the hexane from each of the spiked samples;
  f. admixing a known amount of acidified ethanol with each of the spiked examples, and letting each of the resultant admixtures stand;
  g. separating the acidified alcohol from each of the resultant admixtures; and
  h. determining the amount of gentian violet in the acidified alcohol by spectrophotometrical comparison with acidified alcohol standards containing varied amounts of gentian violet, the determined amount of gentian violet for each sample giving the accuracy of the procedure for the analysis of residual gentian violet in tissue by direct comparison with the known amount of gentian violet placed in each sample in step (b).

6. A process as described in claim 5 wherein a blank sample of egg which contains no gentian violet is treated the same as each of the spiked samples in steps (a) to (f), and wherein the acidified ethanol resulting from the treatment of each of the spiked samples is compared with the acidified ethanol batch resulting from the treatment of the blank sample, this being a check on the acidified ethanol extraction steps.

7. A process as described in claim 5 wherein a blank sample of finely particulated tissue which contains no gentian violet is treated the same as each of the spiked samples in steps (b) to (g), and wherein the acidified ethanol resulting from the treatment of each of the spiked samples is compared with the acidified ethanol batch resulting from the treatment of the blank sample, this being a check on the acidified ethanol extraction steps.

8. A process as described in claim 7 wherein step (c) is repeated twice, wherein step (d) is repeated twice, and wherein steps (f), (g) and (h) are repeated until the acidified alcohol from the sequence of steps (f), (g) and (h) contains no gentian violet, the residue of gentian violet in the known amount of tissue being the total of the determined amount of gentian violet in the acidified alcohol from each sequence of steps (f), (g), and (h).

9. A process as described in claim 7 wherein step (b) is repeated twice, wherein step (c) is repeated twice, and wherein steps (e), (f), and (g) are repeated until the acidified alcohol from the sequence of steps (e), (f) and (g) contains no gentian violet, the residue of gentian violet in the known amount of egg being the total of the determined amount of gentian violet in the acidified alcohol from each sequence of steps (e), (f) and (g).

10. A process for the analysis of the gentian violet in feed or manure which comprises:
  a. extracting substantially all of the fat in the feed or manure using a fat solvent;
  b. drying said fat-extracted feed or manure;
  c. admixing a known amount of acidified ethanol with the fat-extracted feed or manure, and letting the resultant admixture stand;
  d. separating the acidified alcohol from the resultant admixture;
  e. determining the amount of gentian violet in the acidified alcohol by spectrophotometrical comparison with acidified alcohol standards containing set amounts of gentian violet; and
  f. repeating steps (c) to (e) until no gentian violet is found to be present in the acidified alcohol, the total of the gentian violet found from the determination steps being the total amount of gentian violet present in said feed or said manure.

11. A process as described in claim 10 wherein the amount of gentian violet present in the manure is compared with the amount of gentian violet present in the feed before it is fed to said animal or said poultry, the difference being a measure of the gentian violet retained by said animal or said poultry.

12. A process as described in claim 10 wherein said feed is a poultry feed and said manure is poultry manure and wherein said fat extraction step involves first extracting part of said fat from said poultry manure of said poultry feed at least once with petroleum ether and then extracting substantially all of the remaining portion of said fat from said poultry manure or said poultry feed at least once with hexane.

13. A process as described in claim 12 wherein step (d) is achieved by centrifugation.

14. A process for checking the accuracy of a process for the analysis of the gentian violet in feed or manure which comprises;
  a. adding a known amount of various aqueous solutions containing a known amount of gentian violet to known amounts of feed or manure known not to contain any gentian violet to form spiked samples;
  b. extracting substantially all of the fat in each of the spiked samples of feed or manure using a fat solvent;
  c. admixing a known amount of acidified ethanol with each of the spiked examples, letting the resultant admixture stand;

d. separating the acidified alcohol from each of the resultant admixtures;

e. determining the amount of gentian violet in each of the acidified alcohols by spectrophotometrical comparison with acidified alcohol standards containing varied amounts of gentian violet; and f. repeating steps (c) to (e) until no gentian violet is found to be present in the acidified alcohol, the total of gentian violet for each sample giving the accuracy of the procedure for the analysis of residual gentian violet in said manure or said feed by direct comparison with the known amount of gentian violet placed in each sample in step (a).

15. A process as described in claim 14 wherein one of said spiked samples contains no gentian violet so as to be a blank sample, wherein said acidified ethanol batches from the spiked samples are compared with the acidified ethanol batch from the blank sample, this being a check on the acidified ethanol extraction steps.

16. A process as described in claim 14 wherein said feed is a poultry feed and said manure is poultry manure and wherein said fat extraction step involves first extracting part of said fat from said poultry manure or said poultry feed at least once with petroleum ether and then extracting substantially all of the remaining portion of said fat from said poultry manure or said poultry feed at least once with hexane.

17. A process as described in claim 16 wherein step (d) is achieved by centrifugation.

18. A process for the analysis of the residual gentian violet in egg which comprises;

a. admixing a known amount of egg and a known amount of water;

b. allowing the admixture to stand;

c. evaporating or removing the water from the admixture;

d. extracting essentially all of the fat in the egg using a fat solvent;

e. extracting essentially all of the fat remaining in the egg using hexane;

f. evaporating or removing the hexane from the egg;

g. admixing a known amount of acidified ethanol with the egg and letting the resultant admixture stand;

h. separating the acidified alcohol from the resultant admixture; and i. determining the amount of gentian violet in the acidified alcohol by spectrophotometrical comparison with acidified alcohol standards containing set amounts of gentian violet, the determined amount of gentian violet being the residue of gentian violet in the known amount of egg.

19. A process as described in claim 18 wherein the fat solvent is petroleum ether.

20. A process as described in claim 18 wherein step (g) is achieved by centrifugation.

21. A process as described in claim 18 wherein step (d) is repeated twice, wherein step (e) is repeated twice, and wherein steps (d), (h) and (i) are repeated until the acidified alcohol from that sequence of steps (d), (h) and (i) contains no gentian violet, the residue of gentian violet in the known amount of egg being the total of the determined amount of gentian violet in the acidified alcohol from each sequence of steps (d), (h) and (i).

22. A process for checking the accuracy of a process for the analysis of the residue of gentian violet in egg which comprises:

a. admixing a known amount of egg known not to contain any gentain violet with a known amount of an aqueous solution containing a known amount of gentian violet, each aqueous solution containing a different known amount of gentian violet to form spiked samples;

b. extracting substantially all of the fat in each of the spiked samples using a fat solvent;

c. extracting essentially all of the fat remaining in the spiked samples using hexane;

d. evaporating or removing the hexane from each of the spiked samples;

e. admixing a known amount of acidified ethanol with each of the spiked samples; and letting each of the resultant admixtures stand;

f. separating the acidified alcohol from each of the resultant admixtures; and g. determining the amount of gentian violet in the acidified alcohol by spectrophotometrical comparison with acidified alcohol standards containing varied amounts of gentian violet, the determined amount of gentian violet for each sample giving the accuracy of the procedue for the analysis of residual gentian violet in egg by direct comparison with the known amount of gentian violet placed in each sample in step (a).

* * * * *